United States Patent [19]

Bierhoff

[11] Patent Number: 5,036,506
[45] Date of Patent: Jul. 30, 1991

[54] RECORD CARRIER SCANNING APPARATUS WITH FEEDBACK CONTROL SYSTEM FOR CONTROLLING SCANNING POINT POSITION AND VELOCITY

[75] Inventor: Martinus P. M. Bierhoff, Eindhoven, Netherlands

[73] Assignee: U.S. Philips Corporation, New York, N.Y.

[21] Appl. No.: 316,396

[22] Filed: Feb. 27, 1989

[30] Foreign Application Priority Data

Oct. 5, 1988 [NL] Netherlands ................. 8802435

[51] Int. Cl.$^5$ ............................................ G11B 7/095
[52] U.S. Cl. ............................ 369/44.28; 369/44.27; 369/44.11; 369/32; 360/78.06; 360/78.09
[58] Field of Search ............ 369/44.29, 44.34, 44.11, 369/44.41, 44.42, 44.25, 44.35, 44.27, 44.28, 44.31, 44.36; 360/78.06, 78.07, 78.09

[56] References Cited

U.S. PATENT DOCUMENTS

4,545,003  10/1985  Hirano et al. ................. 369/44.28
4,843,602  6/1989  McGee ........................... 369/44.34

Primary Examiner—Roy N. Envall, Jr.
Assistant Examiner—Nabil Hindi
Attorney, Agent, or Firm—Leroy Eason

[57] ABSTRACT

Apparatus for scanning a record carrier having substantially parallel recording tracks, which apparatus includes a position control system with position and velocity feedback for controlling the scanning point toward the center of a track being scanned. Such position control system produces a velocity signal (RS) indicative of the velocity of the scanning point and an error signal (RE) which, within a limited first range to either side of the track center, is proportional to the deviation from the track center. The position control system has a feedback loop which includes a control circuit for controlling the positioning of the scanning point in accordance with the error signal (RE) and the velocity signal (RS), such control circuit generating at least one substitute error signal (PE', UC') when the scanning point deviation is in a second range beyond the aforesaid first range, the substitute error signal having a sign indicative of the direction of such deviation. The control circuit provides the velocity signal (RS) and a position control signal in the feedback loop in response to either the error signal (RE) or the substitute error signal (UC', PE'), depending on whether the deviation is within the first range or the second range. The velocity control signal (RS) is independent of the magnitude of the scanning point deviation.

8 Claims, 7 Drawing Sheets

RECORD CARRIER SCANNING APPARATUS WITH FEEDBACK CONTROL SYSTEM FOR CONTROLLING SCANNING POINT POSITION AND VELOCITY

BACKGROUND OF THE INVENTION

1. Field of the Invention

The invention relates to apparatus for scanning a record carrier having substantially parallel tracks, which apparatus comprises a closed-loop position control system with position and velocity feedback for maintaining the scanning point centered on a specific track. Such control system includes a positioning system for moving the scanning point in a direction transverse to the tracks, a measuring system for generating a velocity signal indicative of the velocity with which the scanning point is moved in a direction transverse to the tracks and an error signal which, within a predetermined limited range to either side of the center of said specific track, is substantially proportional to the deviation between the track centre and the scanning point; and a control circuit for controlling the positioning system in accordance with the error signal and the velocity signal.

The invention further relates to a moved form of the aforesaid control circuit.

2. Description of the Related Art

Apparatus of the aforesaid kind is known from Applicant's U.S. Pat. No. 4,037,252.

Such patent describes an optical scanning system for reading an optically readable disc-shaped record carrier. The error signal derived in such scanning system is a radial-error signal which during a movement of the scanning point varies periodically at a frequency corresponding to a number of tracks traversed per unit of time, and which within a range of ¼ of the track pitch to either side of the track center is substantially proportional to the deviation between the scanning point and the track centre. Moreover, such system derives a track-loss signal which indicates whether the scanning point is positioned substantially on the track or substantially midway between two tracks. The velocity signal is derived from the radial-error signal and the track-loss signal. The velocity signal and the radial-error signal thus obtained are applied to the control circuit to derive a control signal for controlling the positioning system depending on the aforesaid signals. This yields a tracking control system with velocity feedback.

The drawback of such known scanning system is that in the case of a deviation larger than half the track pitch the sign of the error signal will no longer correspond to the sign of the deviation. If as a result of a disturbance, in particular a mechanical shock, the tracking error becomes larger than half the track pitch, the scanning point will be controlled towards an adjacent track instead of the original track. This is troublesome, in particular when the scanning system is used in an environment where it is frequently exposed to mechanical shocks, as for example in portable audio equipment or in automotive uses. In such cases mechanical shocks will frequently result in the scanning point being moved off the track to be followed.

SUMMARY OF THE INVENTION

It is an object of the invention to provide a scanning apparatus which is less sensitive to mechanical shocks.

Apparatus according to the invention is characterized in that the control circuit comprises means for generating at least one substitute error signal which, over a second range outside the aforesaid first range thereof, has a sign which is indicative of the direction of the deviation of the scanning point from a given track. The control circuit controls the positioning system in response to the first error signal or the substitute error signal depending on whether the deviation is situated in the first or the second range, respectively, in such a way that the error signal used for position feedback depends on the magnitude of the deviation and the velocity signal used for velocity feedback is independent of the magnitude of said deviation.

Thus it is achieved that in the case of disturbances for which the deviation is so large that the detected error signal is no longer correctly indicative of the deviation, the control system employs a substitute signal of large magnitude whose sign is indicative of the direction of the deviation, so that the scanning point is rapidly returned to the original track. Since the velocity feedback is constantly operative, the control mode employing the substitute signal smoothly changes over the control mode employing the first error signal for position control. Moreover, during the return to the original track the velocity is limited as a result of the velocity feedback, which precludes overshooting of the track.

In this respect it should to be noted that it is known from U.S. Pat. No. 4,359,625 to apply a substitute error signal to the control circuit of an optical scanning apparatus in response to a track loss indicated by a track-loss signal, by adding an additional signal of constant signal strength to the radial-error signal. A problem which then arises is that as a result of the additional signal the velocity of the scanning point may become so high that when the track is reached it can no longer be slowed down fast enough, so that it overshoots the track. In order to preclude this, the additional signal is generated only during a limited time interval. This, however, has the drawback that if the scanning point has not yet approached the desired track closely enough when generation of the additional signal ceases, the scanning point will still be controlled toward an adjacent track.

When velocity feedback is applied in apparatus in accordance with the invention, the velocity will remain limited as a result of this velocity feedback and so the time interval for generation of the substitute error signal need not be limited.

The velocity signal can be generated in various manners, for example by a velocity transducer which is mechanically coupled to the positioning system. However, it is preferred to derive the velocity signal from signals which are already available.

An embodiment of the scanning apparatus which meets this requirement is characterized in that the measuring system is adapted to generate a tracking-error signal and a track-loss signal which, in the case of a displacement of the scanning point in a direction transverse to the tracks, vary periodically with a frequency corresponding to the number of tracks traversed per unit of time, the phase difference between said signals being substantially 90°. The tracking error over a range corresponding to substantially a quarter track pitch to either side of the center of the nearest track is substantially indicative of the deviation of the scanning point therefrom, and the track-loss signal indicates whether the scanning point is situated substantially on a track or substantially between two tracks. The tracking-error signal is employed as the aforesaid first error signal. For the purpose of generating the velocity signal, the measuring system comprises means for differentiating the tracking error signal and means for multiplying such differentiated signal by the track loss signal.

An embodiment of the scanning apparatus which is attractive because of its simplicity is characterized in that the control circuit is adapted to control the positioning system in dependence upon the substitute error signal if the track-loss signal indicates that the scanning point is situated substantially between two tracks.

A further embodiment of the invention is characterized in that the control circuit comprises counting means for counting, by means of the track-loss signal and the tracking-error signal, the number of tracks traversed by the scanning point and means for controlling the positioning means in accordance with a substitute error signal dictated by the count if the instantaneous count deviates from a predetermined value.

This embodiment has the advantage that in the case of loss of a track, when the scanning point is shifted by more than one track as a result of a mechanical shock, the scanning point is returned to the original track automatically and in a controlled manner, after which it is maintained on the track by controlling its position in accordance with to the first error signal (tracking). Since for returning the scanning point to the desired track the same velocity signal is employed as for tracking, the control mode during which the scanning point is controlled towards such track in response to the substitute error signal changes smoothly to the control mode in which the scanning point is maintained on such in response to the first error signal.

Moreover, this embodiment allows the scanning point to skip over a desired number of tracks. For this purpose the counting means merely need be loaded with a count dictated by the desired displacement. The scanning point is then moved towards the desired track with a controlled velocity. When the desired track is reached a positional error signal will be generated, which is proportional to the deviation of the scanning point, enabling the scanning point to be moved towards and maintained on the centre of the desired track in a damped manner.

Since for displacement over a large number of tracks and also for tracking the same velocity signal can be employed, the displacement control during track crossings changes over smoothly into tracking control after reaching the correct track.

A further embodiment of the apparatus is characterized in that the magnitude of the substitute error signal corresponding to the count increases as the difference between the instantaneous count and said predetermined count increases.

This embodiment has the advantage that in the case of large displacements the velocity can be high as long as the distance from the desired track is still large. As the desired track is approached, however, the velocity is reduced, which prevents overshooting of the desired track. This enables a very rapid and controlled displacement over large distances to be obtained.

The differentiating circuits employed in practice have a transfer function in which the differentiating term increases as the frequency increases up to a specific cross-over frequency, after which the differentiating term decreases again. For determining the velocity signal, this means that derivation of such a signal by means of a differentiating circuit is only feasable for velocities corresponding to frequencies which are sufficiently below said cross-over frequency in order to guarantee stable control. In the case of displacements of the scanning point over large distances it may be desirable, in order to reduce the time required for this displacement, to move the scanning point at velocities in the proximity of the limit velocity defined by said crossover frequency.

An embodiment of the apparatus which meets this requirement is characterized in that it comprises an additional velocity control system for controlling the scanning point velocity to obtain a velocity defined by a reference signal. Such circuit comprises means which are responsive to the count of the counter to disable the position-control system in such a way that the determination of the velocity signal is maintained, and to render the velocity control operative if the deviation signified by the magnitude of the count exceeds a predetermined value.

Since in this embodiment the determination of the velocity signal is maintained during velocity control by means of the additional control system, the initial conditions of control in response to the velocity signal have the correct value at the instant at which the position control system is rendered operative, resulting in a smooth transition from one control mode to the other control mode.

A further embodiment of the device is characterized in that the additional velocity control system comprises means for determining the difference between a reference frequency and the frequency of the tracking-error signal or the track-loss signal, and means responsive to the frequency difference thus determined to control the velocity of the scanning point to a value dictated by the reference frequency.

This embodiment makes advantageous use of the fact that the frequency of the first error signal or the track-loss signal is a measure of the velocity of the displacement of the scanning point.

Although the invention is in principle suitable for use in other than optical scanning apparatus, for example magnetic scanning apparatus, it is particularly suitable for optical scanning apparatus because in such apparatus the error signal and the track-loss signal can be obtained very simply.

BRIEF DESCRIPTION OF THE DRAWINGS

Embodiments of the invention will now described in more detail, by way of example, with reference to FIGS. 1 to 12, in which.

DESCRIPTION OF THE PREFERRED EMBODIMENTS

Figure 1:
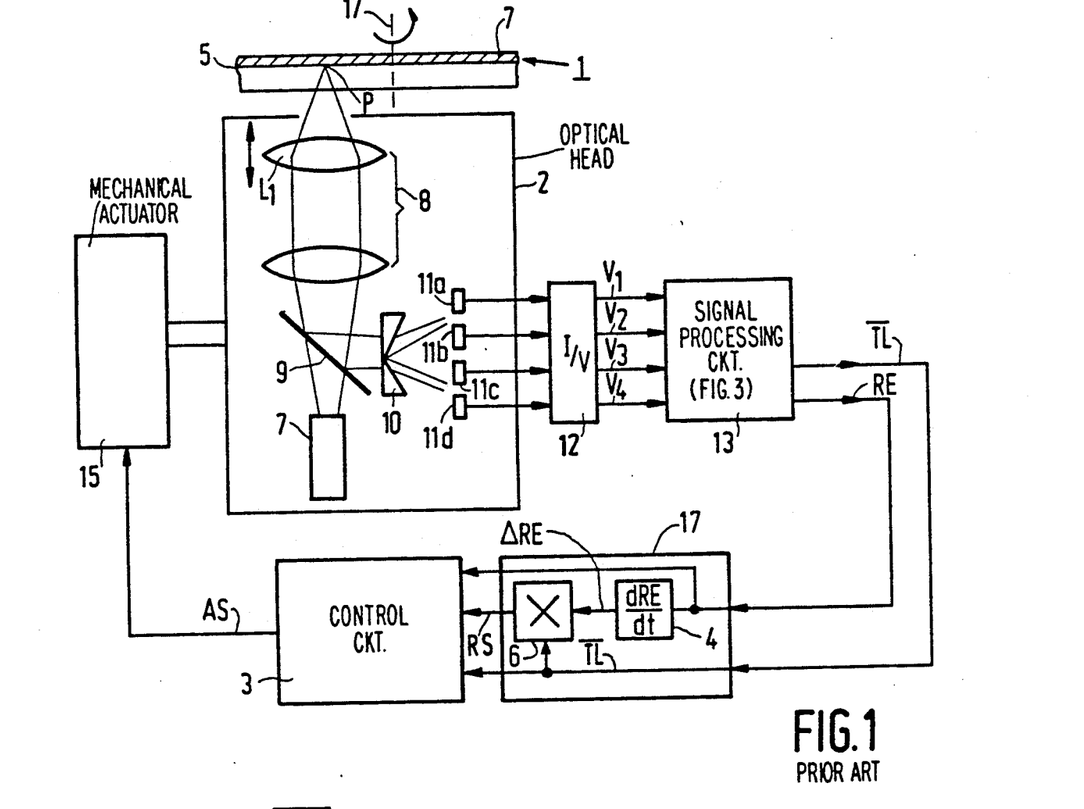
FIG. 1 shows an example of a prior-art scanning apparatus.
Figures 2A, 2B:
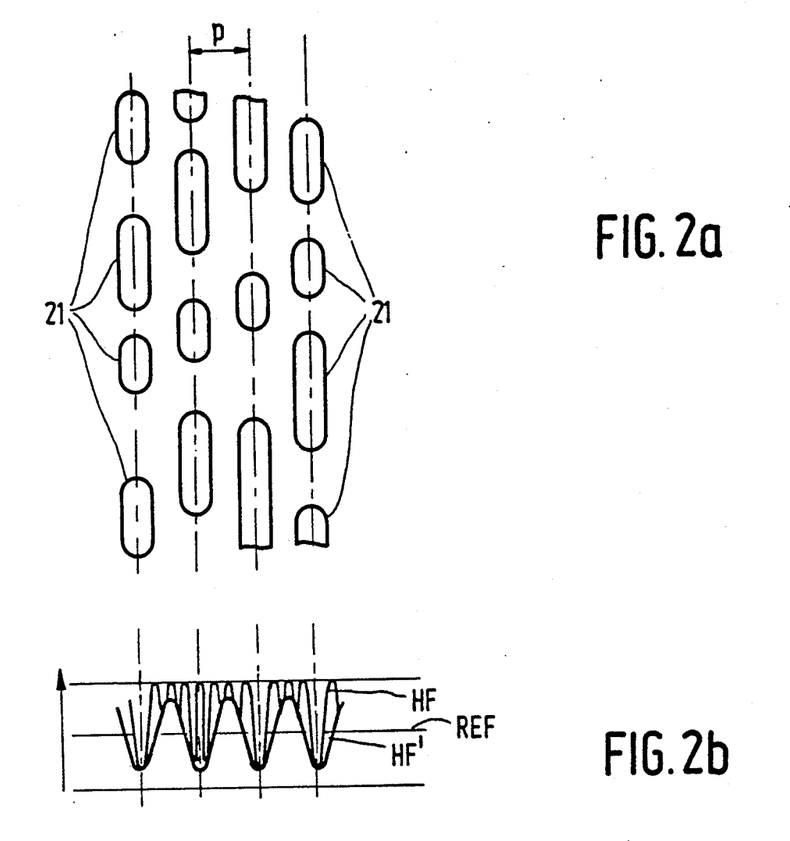
FIG. 2a shows a portion of tracks on an optical record carrier.
FIG. 2b shows the variation of the measurement signal generated by the apparatus in FIG. 1 during the displacement of the scanning point in a direction transverse to the tracks.

FIG. 1 shows a prior-art scanning apparatus. The scanning apparatus shown is for optically scanning an optical record carrier 1, for example a "Compact Disc", which is rotated about an axis 17. Such a record carrier 1 comprises an information layer 5. The information layer 5 has tracks in which information is recorded as a pattern of optically detectable recording marks, for example in the form of pits. FIG. 2a shows a part of the tracks to a strongly enlarged scale, the recording marks bearing the reference numeral 21. The information recorded in the tracks can be read by scanning the tracks with a radiation beam and thus detecting the beam modulation produced by the recording marks 21. For this purpose the scanning apparatus comprises an optical read head 2 of a customary type, which comprises a radiation source in the form of a laser 7. The beam generated by the laser 7 is aimed at the information layer 5 via a semi-transparent mirror 9, the beam being focused to form a tiny scanning spot P on the information layer 5 by means of a lens system 8. The beam which is reflected from the information layer 5 is projected onto an array of four optical detectors 11a, 11b, 11c and 11d via the semi-transparent mirror 9 and a beam splitter in the form of a roof prism 10.

The currents supplied by the optical detectors are converted into signal voltages V1, V2, V3 and V4 by means of a current-voltage converter 12. A signal-processing circuit 13 derives an error signal RE and a track-loss signal $\overline{TL}$ from these signal voltages. The error signal RE is indicative of the tracking error, which is the deviation of the scanning point defined by the scanning spot P from the centre of the track to be followed. The track-loss signal $\overline{TL}$ indicates whether the scanning point defined by the scanning spot P is situated in the centre of a track or in the middle between two tracks.

Figure 3:
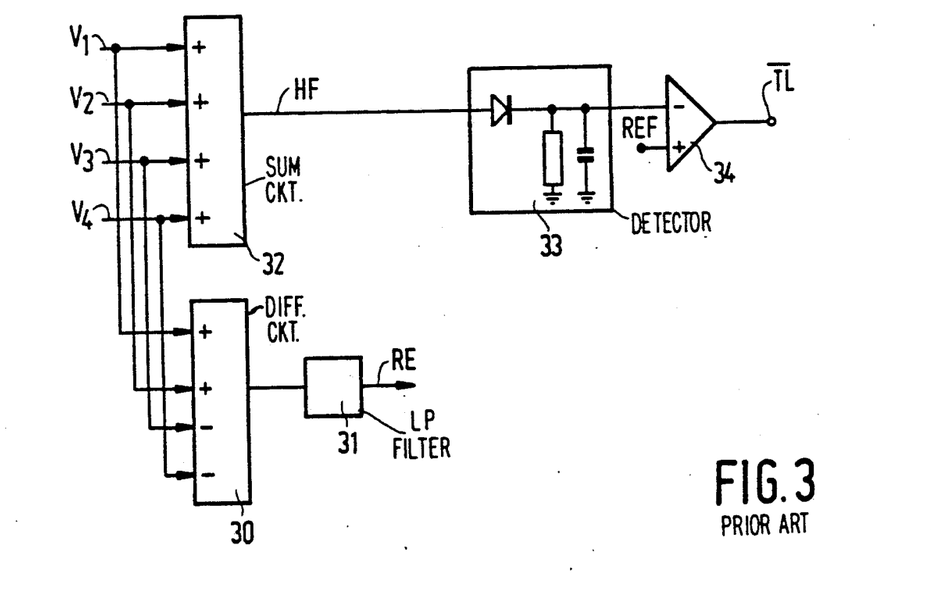
FIG. 3 shows an example of a prior art circuit for generating the error signal and the track-loss signal.

FIG. 3 shows diagrammatically a typical example of a signal-processing circuit 13. The signal-processing circuit 13 comprises a difference circuit 30 which determines the difference between the sum of the signal voltages V1 and V2 and the sum of the signal voltages V3 and V4. If a high-frequency signal component caused by the beam modulation is ignored, the detected difference is a measure of the position of the scanning point. The high-frequency signal component is removed by means of a low-pass filter 31. The output signal of the low-pass filter 31 constitutes the error signal RE.

A summing circuit 32 derives from the signal voltages V1, V2, V3 and V4 a signal HF which is indicative of the sum of these four signal voltages. By means of a customary envelope detector 33 and a comparator 34, which compares the output signal of the envelope detector with a reference value REF, the track-loss signal $\overline{TL}$ is derived from the signal HF. The signal HF is indicative of the beam modulation produced by the recording marks. This modulation is maximal if the beam is aimed at the centre of the track and is minimal if said beam is incident midway between two tracks, so that the measurement signal $\overline{TL}$ indicates whether the beam is aimed at the track or at the middle between two tracks. It will be evident that, in principle, the signal at the output of the envelope detector 33 is already an indication of whether the scanning point is situated substantially in the centre of a track, so that in principle this signal may also be employed as a track-loss signal. However a bivalent track-loss signal, such as a signal $\overline{TL}$, is to be preferred.

Figure 2C:
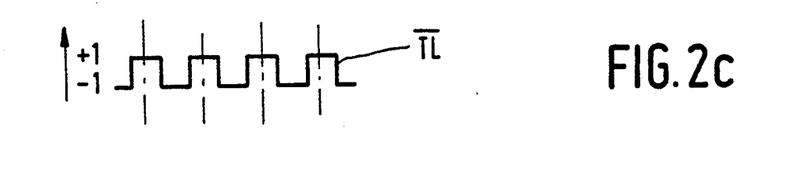
FIGS. 2c and 2d show track loss and error signals generated by the apparatus of FIG. 1.

FIG. 2b by way of illustration shows the signal HF in the case that the optical read head 2 is moved in a direction transverse to the tracks of the rotating record carrier 1. As is evident from FIG. 2b the amplitude of signal HF will vary with a frequency corresponding to the number of tracks traversed per unit of time. FIG. 2c shows the error signal $\overline{TL}$ derived from the signal HF. The amplitude of the measurement signal HF is maximal if the scanning point corresponding to the point of incidence of the beam is situated in the centre of a track and this amplitude HF is minimal if the scanning point is situated midway between the two tracks.

Figure 2D:
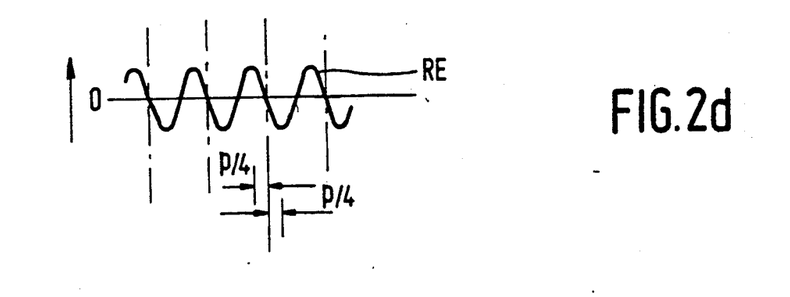

FIG. 2d further shows the position error signal RE. As the scanning point is moved the error signal RE will also vary with a frequency equal to the number of tracks traversed per unit of time. The error signal RE is 90° phase shifted relative to the track-loss signal $\overline{TL}$. Within a range of a quarter of the track pitch p around the centre of each track the measurement signal RE is substantially proportional to the distance between the scanning point and the track centre.

In the scanning apparatus shown in FIG. 1 the signals $\overline{TL}$ and RE are applied to a circuit 17. The circuit 17 comprises a differentiating circuit 4 for differentiating the error signal RE and a multiplier 6 for multiplying the differentiated error signal $\Delta$RE by the track-loss signal $\overline{TL}$. The output signal of the multiplier 6 bears the reference RS. The signals RE, $\Delta$RE, $\overline{TL}$ and RS as produced in the case of a displacement of the scanning point are shown as a function of time t in FIG. 4. The amplitude of the signal $\Delta$RE is proportional to the velocity with which the scanning point is moved. Moreover, as a result of the differentiation this signal is 90° phase-shifted relative to the signal RE and, consequently, it is in phase with or in phase opposition to the measurement signal $\overline{TL}$ depending on the direction of the displacement.

Figure 4:
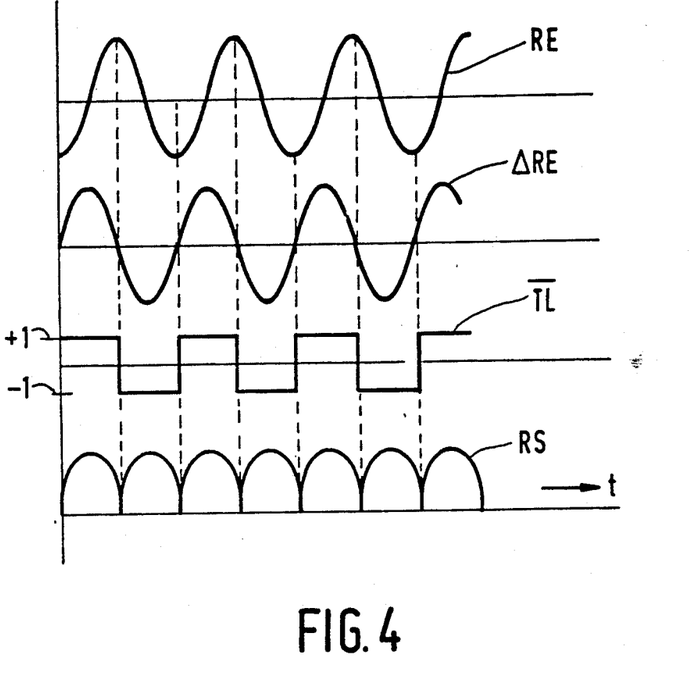
FIG. 4 shows these signals and the velocity signal derived from these signals as a function of time.

The sign of the velocity signal RS thus obtained therefore always indicates the direction of the displacement, and the magnitude of the signal RS is an indication of the magnitude of the displacement velocity. The velocity signal RS together with the error signal RE and, if applicable, the track-loss signal $\overline{TL}$ is supplied to a control circuit 3.

Figure 5:
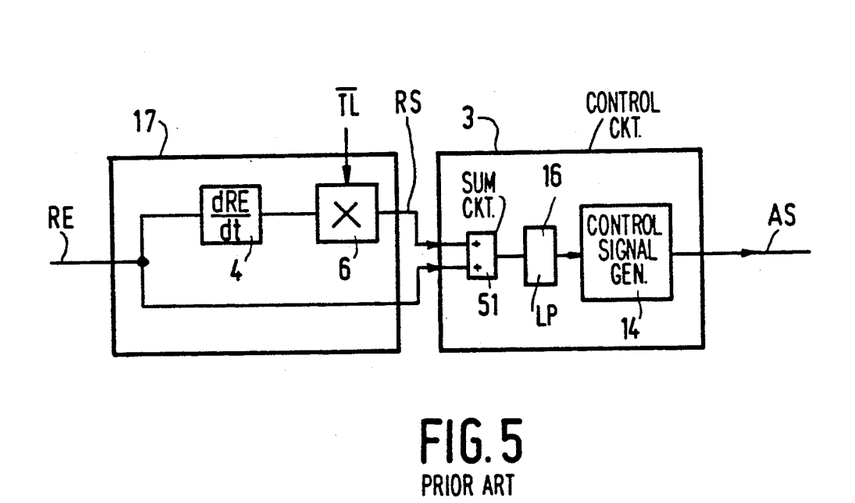
FIG. 5 shows an example of a prior-art control circuit.

FIG. 5 shows a prior-art form of control circuit 3 which utilizes the velocity signal RS in order to realize a position control system with velocity feedback. The velocity signal RS and the error signal RE are added by means of a summing circuit. The output signal of the summing circuit is applied to a control signal generating circuit 14, if required via low-pass filter 16, to generate a control signal AS for controlling a mechanical actuator 15 for positioning the read head 2. Depending on the output signal of the summing circuit 51 the control signal from circuit 14 controls the actuator 15 in such a way that the tracking error represented by the signal RE is minimized.

The velocity signal feedback increases the damping of the feedback tracking system, which results in a more stable control which is more immune to mechanical shocks. When the control circuit shown in FIG. 5 is employed the scanning point is maintained at the track centre, which means that a tracking system is obtained.

Figure 6:
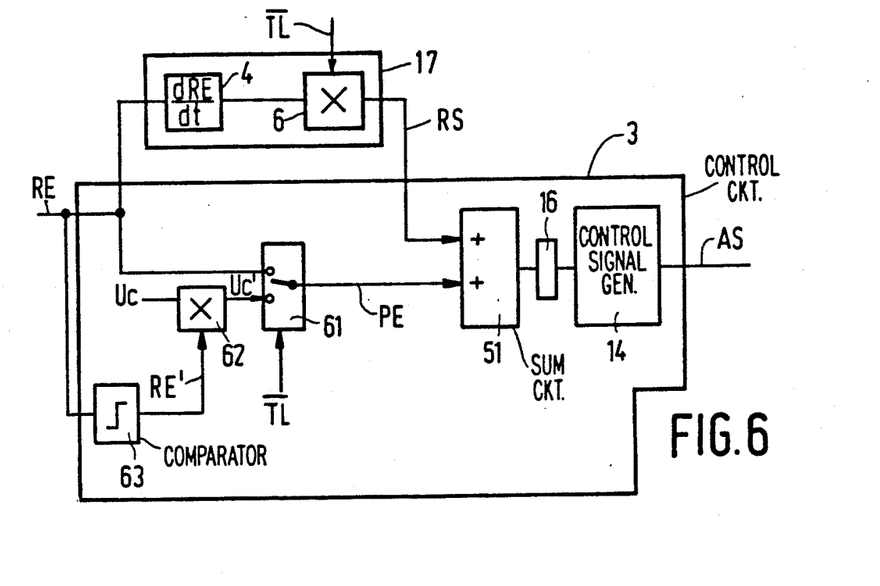
FIGS. 6, 8 and 11 show a number of different embodiments of a control circuit in accordance with the invention.

FIG. 6 shows an embodiment of a control circuit 3 in accordance with the invention, and which provides a tracking which is more immune to mechanical shocks than the prior art control circuit in FIG. 5.

The circuit shown in FIG. 6 comprises an electronic switch 61 which is controlled by the track-loss signal $\overline{TL}$ and which applies a signal UC' to the summing circuit 51 as soon as the track-loss signal $\overline{TL}$ indicates that the scanning point is no longer situated substantially at the centre of a track. If the track-loss signal $\overline{TL}$ indicates that the scanning point is situated substantially on the track the switch 61 is switched to apply the measured error signal RE to the summing circuit 51 as the position-error signal PE. If the scanning point is off track, the switch 61 supplies as the position-error signal PE a substitute signal UC' which has a constant strength and a polarity corresponding to the sign of the error indicated by the signal RE.

Figure 7:
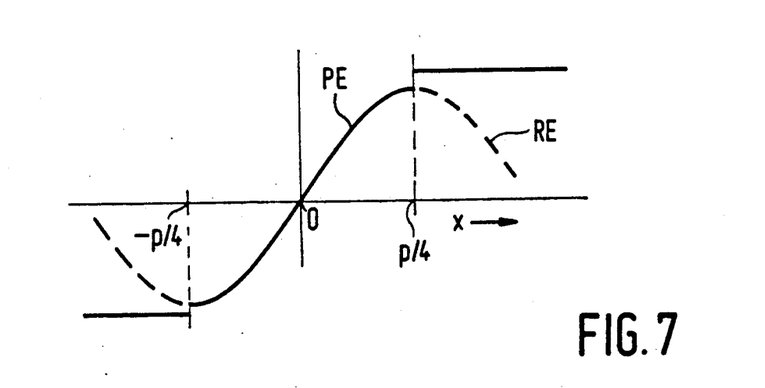

The signal UC' is obtained by means of a multiplier 62 which multiplies a signal UC of fixed polarity with a sign signal RE' indicating the sign of the error measurement signal RE. By means of a polarity detector, for example a comparator 63, a sign signal RE' is derived from the error signal RE. FIG. 7 shows the position-error signal PE at the output of the electronic switch 61 as a function of the distance x between the track centre and the scanning point.

Figure 6A:
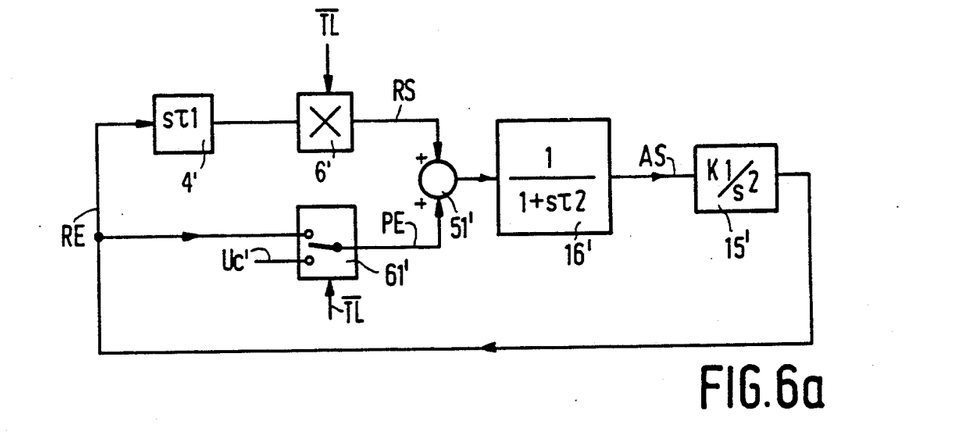
FIG. 6a is a block diagram of the control system obtained if the control circuit shown in FIG. 6 is employed in the scanning apparatus shown in FIG. 1, FIGS. 7, 10 and 12a and 12b show a number of signal waveforms generated in the control circuits in accordance with the invention.

FIG. 6a shows a block diagram of the complete control system which is obtained if the control circuit 3 shown in FIG. 6 is used in the optical scanning apparatus shown in FIG. 1. In this block diagram the blocks with the transfer functions of the differentiating circuit 4, the multiplier circuit 6, the summing circuit 51, the low-pass filter 16 and the electronic switch 61 bear the reference numerals 4', 6', 15', 16', and 61' respectively. The reference numeral 15' refers to the overall transfer function of the control signal generating circuit 14, the mechanical actuator 15, the read head 2, the current-voltage converter 12 and the signal-processing circuit 13. As long as the scanning point is situated substantially on a track the signal $\overline{TL}$ remains 1. The position-error signal PE is then identical to the error signal RE. The control system shown in FIG. 6a then behaves as a position control system which controls the scanning point in such a way that the signal RE is maintained substantially at zero. The open-loop transfer function Ho(s) of this position control system is as follows:

$$Ho(s) = \frac{K1}{s^2} \cdot \frac{1 + s \cdot \tau_1}{1 + s \cdot \tau_2}$$

Here
s is the Laplacian operator;
$\tau_1$ is the time constant of the differentiating circuit 4;
$\tau_2$ is the time constant of the low-pass filter 16;
K1 is the loop gain of the control loop.

The transfer characteristic Ho(s) represents a third-order system which is well known in control technology and which in the case of feedback is stable if the time constant $\tau_1$ is selected to be larger than the time constant $\tau_2$ (for example $\tau_1 \approx 10.\tau_2$).

It will be obvious to those skilled in the art that in principle the low-pass filter 16 may be removed from the control system. Indeed, in that case the time constant $\tau_2$ will be zero. However, the use of the low-pass filter 16 results in a substantial reduction of the noise produced by the control system, so that it is preferred to employ this filter. The use of velocity feedback results in a null in the open-loop transfer characteristic Ho(s), which greatly improves the stability of the feedback tracking control system. The tracking system thus formed will therefore be highly immune to disturbances such as for example mechanical shocks.

In the case that a mechanical shock causes the scanning point to be displaced so far that it no longer remains on the track, the sign of the signal $\overline{TL}$ will change, so that the constant signal Uc' is used as the position-error signal PE. This results in the control characteristic of the control system being changed. In fact the control system will now behave as a velocity control system which controls the velocity of the scanning point, as represented by the signal RS, to the value given by the signal Uc'. The open-loop transfer function Hso(s) of this velocity control loop is as follows:

$$Hso(s) = \frac{K1 \cdot \tau_1}{s(1 + s \cdot \tau_2)}$$

This transfer function Hso(s) represents a second-order system which also is well known in control technology and which is also stable in the case of feedback. The sign of Uc' is the same as the sign of the signal RE, so that the scanning point is rapidly directed towards the track. The velocity control system limits the velocity to a value dictated by Uc'. At the instant at which the signal $\overline{TL}$ indicates that the track is reached the switch 61 is changed over again, causing the control system to again behave as a tracking system. Since the velocity at which the track is reached is limited it is ensured the scanning point does not overshoot the track. Moreover, in both control modes (velocity control and tracking control) the same velocity signal is employed, so that always a smooth transition from one control mode to the other is obtained. Indeed, when a new control mode sets in the initial conditions are always correct, so that no transient effects occur.

Figure 8:
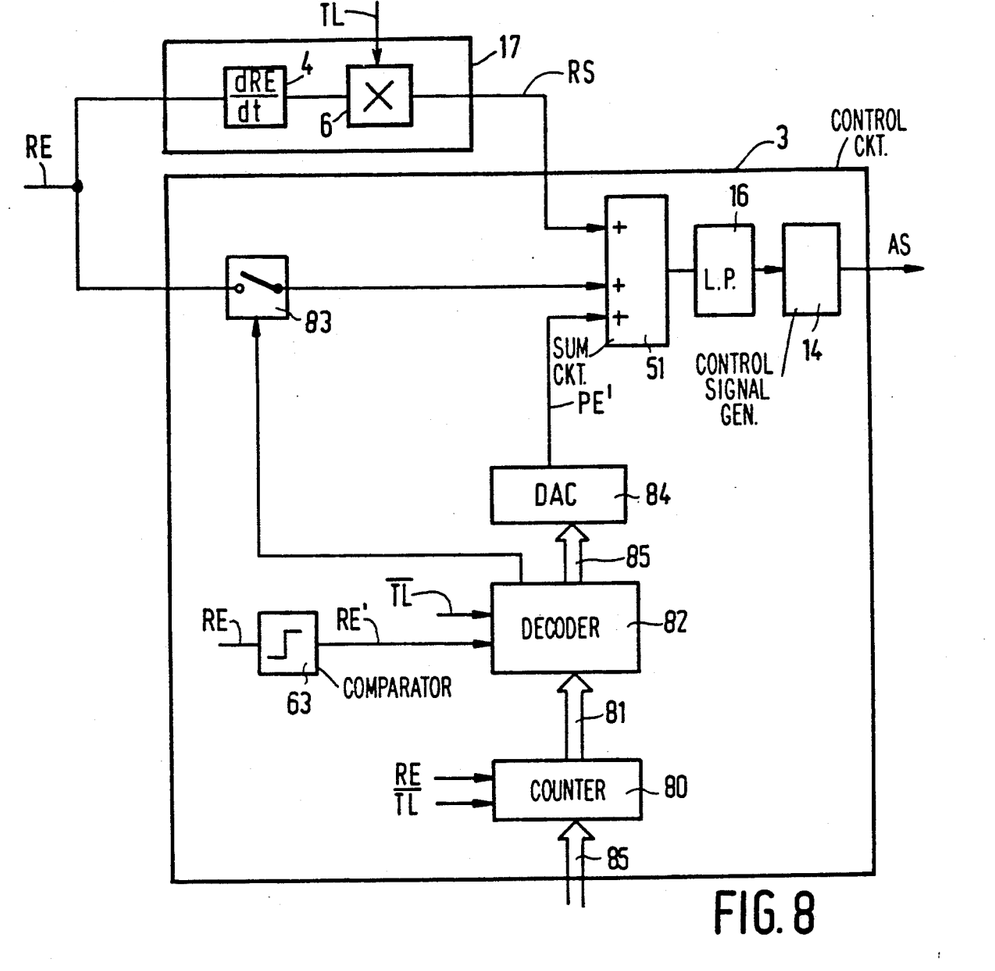
Figure 9:
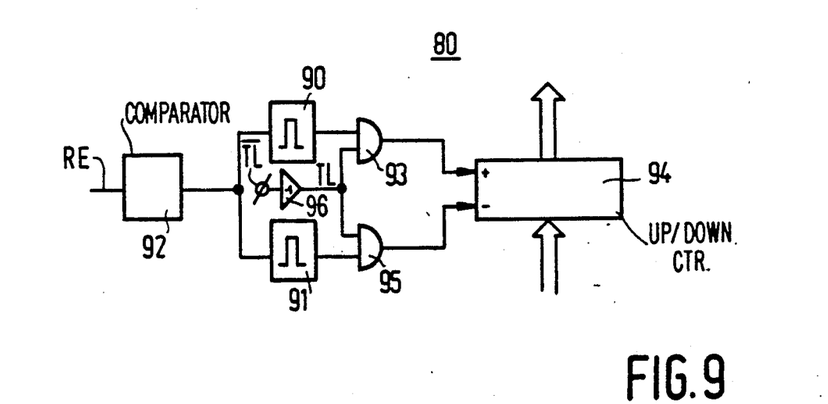
FIG. 9 shows an example of a counting circuit for use in the control circuit in accordance with the invention.

FIG. 8 shows yet another embodiment of a control circuit 3 in accordance with the invention, in which the scanning point is returned to the desired track in the event of a disturbance which causes it to be displaced over a number of tracks. The circuit shown in FIG. 8 comprises a conventional counting circuit 80 which in response to the signals $\overline{TL}$ and RE counts the number of tracks traversed by the scanning point. FIG. 9 shows an example of such a counting circuit 80.

The counting circuit 80 shown in FIG. 9 comprises a comparator 92, which converts the measured error signal RE into a bivalent signal. This bivalent signal is applied to the inputs of two edge-triggered monostables 90 and 91. In response to a falling edge of the output signal of the comparator 92 the monostable 90 generates a pulse, which is applied to a first count input of an UP/DOWN counter 94 via a two-input AND gate 93. In response to a rising edge of the output signal of the comparator 92 the monostable 91 generates a pulse, which is applied to a second count input of the UP/-

DOWN counter 94 via a two-input AND gate 95. Moreover, the signal $\overline{TL}$ is applied to the other inputs of the AND gates 93 and 96 via an inverter circuit 95. The UP/DOWN counter 94 is of a type which increments the count by one in response to a pulse on the first count input and which decrements the count by one in response to a pulse on the second count input. The number of tracks passed counted as follows. As the scanning point is moves the signal $\overline{TL}$ goes high during passage of the lands between the tracks. The polarity of the signal RE will then change from positive to negative or from negative to positive depending on the direction of the movement. If the polarity of signal RE changes from positive to negative the monostable 90 will generate a pulse. Since the inverted signal $\overline{TL}$ is high this pulse is transferred to the gate 93, causing the count of the counter to be incremented by one. However, if during the passage of the land between two tracks the signal RE goes from negative to positive the multivibrator 91 will generate a, pulse which is then applied to the second count input of the counter 94 via the AND gate 95, causing the count to be decremented by one.

The changes in polarity of the signal RE during passage of the centre of a track do not affect the count because the pulses generated by the monostable are then not transferred by the AND gates 93 and 95 since the inverted signal $\overline{TL}$ is then low. Consequently, the count of the counter 94 is always indicative of the number of tracks passed. The count of the counter is applied to a decoder circuit 82 via a bus 81. In addition to the count of the counter 80 the signal $\overline{TL}$ and the sign signal RE' are applied to the decoder circuit.

On the basis of the count and the signals $\overline{TL}$ and RE the decoder circuit 82 produces a digital code, which is applied to a digital-to-analog converter 84 via a bus 85. The digital-to-analog converter 84 generates an error signal PE', whose signal strength corresponds to the digital value determined by the code which is received. The error signal PE' is applied to the summing circuit 51, which for this purpose is provided with a third input. The decoder circuit 82 further generates a control signal for an electronically operated switch 83 arranged in the signal path to apply the signal RE to the summing circuit 51. Such control signal from decoder circuit 82 causes the electronic switch 83 to close exclusively when both the count of counter 80 is zero and the signal level of the measurement signal $\overline{TL}$ is high. In this situation the decoder circuit moreover supplies a code to the digital-to-analog converter 84, as a result of which the signal PE' at the output of the digital-to-analog converter 84 is zero.

In the situation in which the count is zero and at the same time the signal level of the signal $\overline{TL}$ is high, the decoder circuit generates a code with a polarity dictated by the sign signal RE' and such that the polarity of the output signal of the digital-to-analog converter will be the same as the polarity of the signal RE. The sign of the error signal PE' is then the same as the sign of the error signal RE. For a non-zero count the decoder circuit generates a code representing an analog value of a polarity dictated by the sign of the count, and such that the output signal of the digital-to-analog converter 84 causes the scanning point to be moved a direction in which decreases the absolute value of the count.

The decoder circuit 82 may comprise, for example, a read-only memory (ROM) to which the count and the signals RE' and $\overline{TL}$ are applied as address signals and which is loaded with the output signals required for the various address signals. Alternatively, the decoder circuit 82 can be realized in a customary manner by means of logic gate circuits.

The circuit shown in FIG. 8 operates as follows. If the count of the counter 80 is not zero the signal PE' is applied to the summing circuit 51 via the digital-to-analog converter 84, said signal having a polarity dictated by the sign of the count. As a result of this, the scanning point will be moved in a direction determined by the sign of the count. The velocity feedback then ensures that the velocity of the displacement is controlled to a value dictated by the output signal PE' of the digital-to-analog converter 82. During the displacement the scanning point crosses the tracks, causing the count to change towards zero. As soon as the count reaches zero the signal PE' is applied to the summing circuit 51 via the digital-to-analog converter 84, the polarity of said signal PE' being determined by the sign signal RE', so that control of the displacement via the digital-to-analog converter 84 is sustained until the signal level of the signal $\overline{TL}$ goes high, after which the output signal of the digital-to-analog converter 84 becomes zero and the switch 83 is closed. The position of the scanning point is then controlled towards the centre of the track being scanned depending on the measured error signal RE. The velocity feedback is sustained during the entire control action, so that the control mode in which the scanning point traverses a number of tracks given by the initial count of the counter changes over smoothly the control mode in which the scanning point is maintained at the centre of the desired track in the basis of the tracking error indicated by the measured error signal RE.

As will be apparent from the foregoing, the scanning point will always be returned to the original track in a smooth manner in the event of a mechanical shock causing loss of track. However, the circuit shown in FIG. 8 is also suitable if it is desired to move the scanning point over a specific known number of tracks, as is customary in performing search commands. This can be achieved simply by providing that counting circuit 80 is a counter which via a bus 85 can be loaded with a count representing a specified excursion relative to the desired track.

It is desirable that the movement of the scanning point to the desired track proceeds rapidly. This can be achieved simply by constructing the decoder circuit 82 in such a way that the magnitude of the signal defined by the generated codes increases as the number of tracks to be traversed increases. The velocity of displacement will then be higher in the case of a large distance between the scanning point and the desired track. The velocity of the movement determined by the magnitude of the signal PE' will decrease as the distance from the desired track decreases. In this way it is achieved that the displacement to the desired track proceeds rapidly, but the velocity will have decreased sufficiently when the track is approached so that overshooting does not occur.

In the circuit shown in FIG. 8 the velocity with which the tracks are traversed during passage of the tracks cannot be increased to an unlimited extent. This is because at high velocities the velocity signal RS is no longer proportional to the actual velocity of the scanning point. Above a specific velocity the magnitude of the velocity signal RS will decrease at increasing velocity. Indeed, in practice the differentiating circuits employed have a transfer characteristic which exhibits at least one pole, so that the differentiating term in the transfer characteristic decreases above a cross-over frequency defined by said pole. This means that for velocities V of the movement of the scanning point above a specific velocity the velocity signal decreases at increasing velocity. This effect becomes even more pronounced when the low-pass filter 16 is used.

Figure 10:
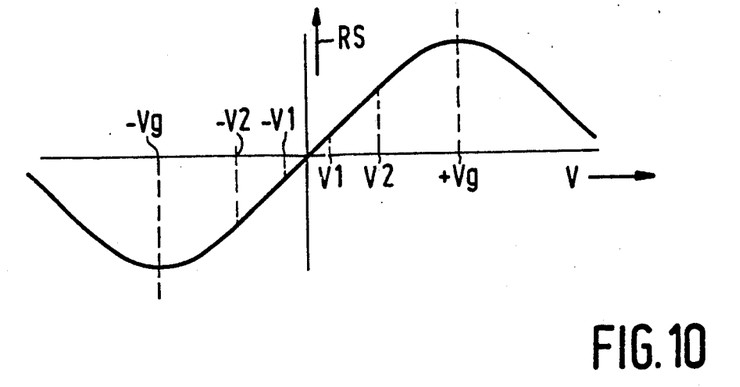

By way of illustration FIG. 10 gives the relationship between the velocity signal RS and the velocity V of the scanning point movement. Above a specific absolute value Vg of the scanning velocity V the absolute value of the velocity signal RS decreases as the absolute value of the velocity V increases. Consequently, in view of the risk of instability of the control system it is desirable that the circuit shown in FIG. 8 be employed only for controlling velocities sufficiently below the limit velocity Vg.

Figure 11:
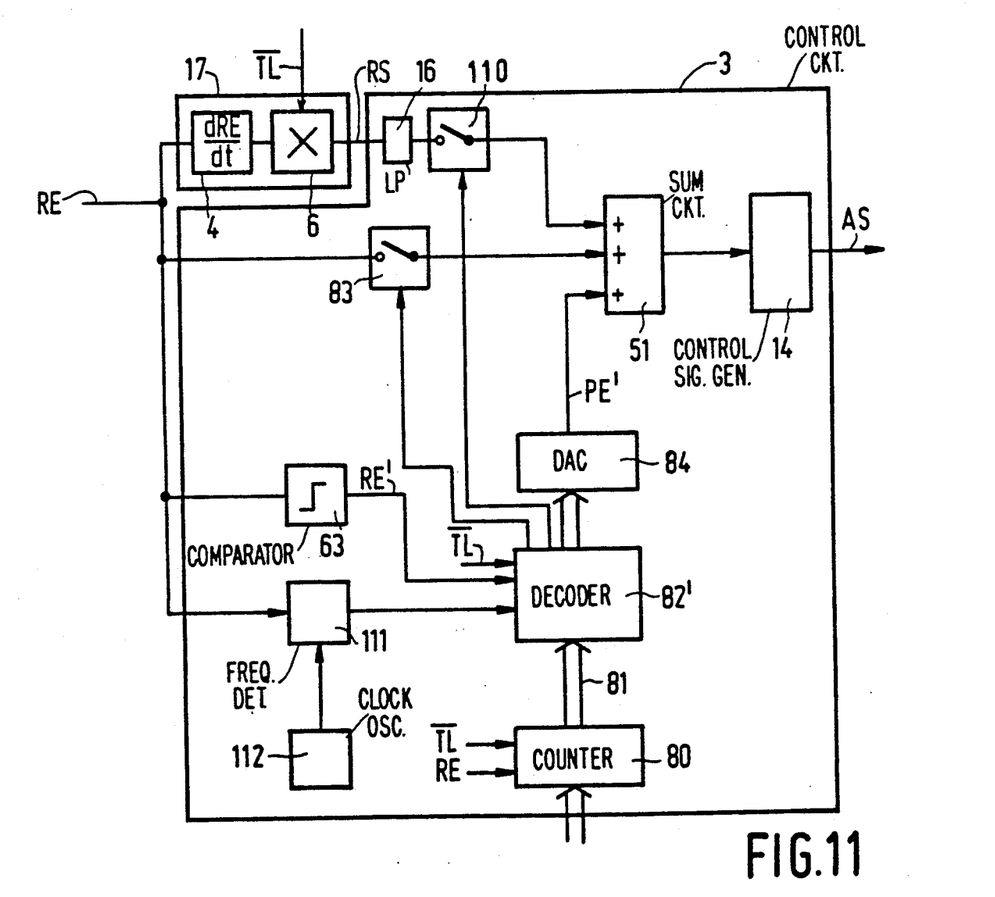

FIG. 11 shows a modification of the circuit of FIG. 8 which enables the velocity of the movement of the scanning point in the case of displacements over a large number of tracks to be controlled at a velocity substantially corresponding to the limit value Vg. In the circuit shown in FIG. 11 the input of the low-pass filter 16 is connected directly to the output of the multiplier circuit 6. The output of the low-pass filter is connected to one of the inputs of the summing circuit 51 via an electronically controlled switch 110. The switch 110 is controlled by a control signal generated by a modified decoder circuit 82'. The circuit further comprises a frequency detector 111, which compares the frequency of the signal RE, or if applicable the frequency of the signal $\overline{TL}$, with the frequency of a clock signal of constant frequency generated by an oscillator 112. A signal which is at least indicative of the sign of the frequency difference thus determined is applied to the modified decoder circuit 82'. In addition to the functions of the decoder circuit 82 described above the modified decoder circuit 82' also performs some other functions.

If the absolute value of the count is larger than a preset value nmax the switch 110 is opened by a signal from the decoder circuit 82' so as to inhibit application of the velocity signal RS to the summing circuit 51. Moreover, for a count above nmax the decoder circuit 82' supplies a code to the analog-to-digital converter 84, which code depends on the output signal of the frequency detector 111, in such a way that the sign of the signal PE' is dictated by the sign of the count and the sign of the output signal of the frequency detector 111. Thus, in the case of displacements over a number of tracks larger than nmax, control of scanning point velocity by feedback of the velocity signal RS is discontinued and the velocity of displacement of the scanning point is instead set to a value at which the frequency of the signal RE will be equal to the frequency of the clock signal supplied by the oscillator 112, the direction of the displacement being given by the sign of the count of the counting circuit 80. The frequency of the clock signal supplied by the oscillator 112 is selected so that the corresponding velocity of the scanning point corresponds to the value +Vg or −Vg indicated in FIG. 10, depending on the sign of the count.

Further, for an absolute value of the count between nmax and n1 the signal PE' supplied by decoder 82' to the summing circuit 51 via the analog-to-digital converter 84 corresponds to a controlled velocity v of +v2 or −v2, depending on the sign of the count. For a count having an absolute value between 1 and n1 the signal supplied via the analog-to-digital converter 84 corresponds to a velocity of +v1 or −v1.

Figure 12A:
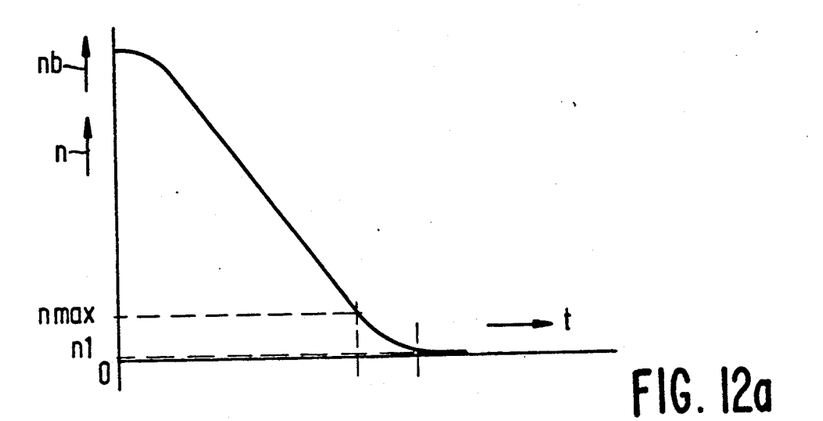
Figure 12B:
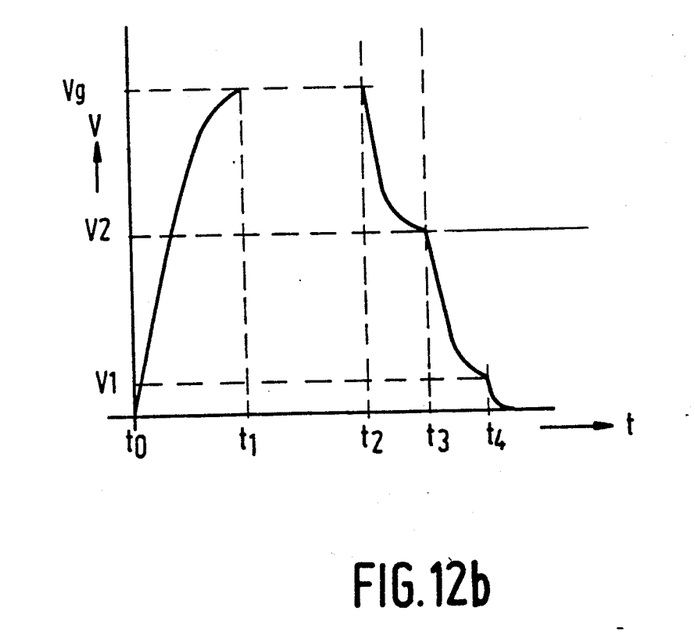

FIGS. 12a and 12b show shows the variation of the count n and velocity V as a function of time when the scanning point is displaced over a number of tracks nb larger than nmax. At the instant the counter is loaded with the count nb, the velocity is controlled towards the value Vg defined by the frequency of the clock signal 112 supplied by the oscillator. The velocity Vg is reached at the instant t1, after which it is maintained at said value Vg until the instant t2 at which the count nmax is reached.

At the instant t2 velocity control on the basis of the frequency difference determined by the frequency detector 111 is terminated, and the velocity signal is again applied to the adder circuit. The velocity is therefore controlled towards the velocity v2 defined by the output signal of the analog-to-digital converter.

At the instant t3 the count reaches the value n1, and so the signal PE' applied to the summing circuit 51 via the digital-to-analog converter 84 is changed so that the velocity V is controlled towards the value v1. When the desired track is reached, i.e. the count reaches zero and the signal level of the measurement signal TL goes high, the output signal of the digital-to-analog converter becomes zero at the instant t4 and the switch 83 is closed. From the instant t4 the scanning point is controlled towards and maintained on the track on the basis of the tracking error represented by the measured error signal RE.

In the embodiments described in the foregoing the velocity signal is always derived from the signals $\overline{TL}$ and RE. However, it is obvious that the velocity signal may also be derived in another manner, for example by means of a velocity transducer which is mechanically coupled to the read head.

In the embodiments described above the tracking-error signal is a signal which is proportional to the tracking error over a range of a quarter of the track pitch to either side of the center of the track. However, it is to be noted that the error signal for tracking control may alternatively be a signal which is proportional to the tracking error over a larger range, as is described for example in said open Netherlands Patent Application No. NL-A-86020911.

What is claimed is:

1. Apparatus for scanning a record carrier having substantially parallel recording tracks, such apparatus including a position control system having a feedback loop for controlling the position and velocity of a scanning point so as to follow said tracks, said position control system comprising: actuating means for moving the scanning point in a direction transverse to the tracks; means for generating a velocity signal indicative of the scanning point velocity in a direction transverse to the tracks; means for generating a tracking error signal which within a predetermined first limited range to either side of the center of a track being scanned is proportional to the deviation between the center of such track and said scanning point; and a control circuit for deriving from said tracking error signal and said velocity signal a control signal for said positioning control system to cause it to move the scanning point in accordance with said control signal; characterized in that said control circuit comprises:

means for generating at least one substitute error signal when the deviation of the scanning point from the center of a track being scanned is within a second range outside the first range, said substitute error signal having a polarity corresponding to the direction of such deviation; and means for substituting said substitute error signal for said tracking error signal when the scanning point deviation is in said second range, so that when said deviation is in said second range said control signal controls movement of said scanning point in accordance with said velocity signal and said substitute error signal, said velocity signal being independent of whether the scanning point deviation is in said first range or said second range.

2. Apparatus as claimed in claim 1, wherein said position control system further comprises means for generating a track-loss signal indicative of whether said scanning point is situated substantially on a track or between adjacent tracks, said tracking error signal and said track loss signal both having a periodic variation at a frequency corresponding to the number of tracks traversed by said scanning point per unit of time and having a phase difference there-between of substantially 90°; and said means for generating said velocity signal generates it by differentiating said tracking error signal and multiplying the differentiated signal by said track loss signal.

3. Apparatus as claimed in claim 2, wherein when said track loss signal indicates that said scanning point is between adjacent tracks, said control circuit derives said control signal from said velocity signal and said substitute error signal.

4. Apparatus as claimed in either of claims 2 or 3, wherein said control circuit further comprises counting means which receives said tracking error signal and said track loss signal and determines therefrom a count of the number of tracks traversed by said scanning point, said means for generating said substitute error signal does so based on the count of said counting means, and said control signal controls movement of said scanning point in accordance with said velocity signal and said substitute error signal when the count of said counting means deviates from a predetermined count value.

5. Apparatus as claimed in claim 4, wherein the magnitude of said substitute error signal is increased as the difference between the instantaneous count of said counter and said predetermined count value increases.

6. Apparatus as claimed in claim 4, wherein said control circuit further comprises a decoder responsive to the count of said counter so that when such count exceeds said predetermined count value said decoder substitutes for said scanning point velocity signal a substitute velocity control signal of substantially constant magnitude.

7. Apparatus as claimed in claim 6, wherein said decoder comprises: frequency difference detecting means for determining the difference between a reference frequency and the frequency of either said tracking error signal or said track loss signal, and means responsive to the frequency difference thus determined to set the magnitude of said substitute velocity control signal so that the velocity of said scanning point corresponds to said reference frequency.

8. Apparatus as claimed in claim 1, wherein such apparatus is for optically scanning an optically readable record carrier.

* * * * *